United States Patent
Shah et al.

(10) Patent No.: US 11,734,457 B2
(45) Date of Patent: Aug. 22, 2023

(54) TECHNOLOGY FOR CONTROLLING ACCESS TO PROCESSOR DEBUG FEATURES

(71) Applicant: Intel Corporation, Santa Clara, CA (US)

(72) Inventors: Neel Piyush Shah, Billerica, MA (US); Enrico David Carrieri, Placerville, CA (US); Aditya Katragada, Austin, TX (US); Jonathan Mark Lutz, Cornelius, OR (US); Michael Carl Neve de Mevergnies, Beaverton, OR (US); Bhavana Prabhakar, Lake Forest, CA (US)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 16/724,555

(22) Filed: Dec. 23, 2019

(65) Prior Publication Data

US 2021/0192085 A1  Jun. 24, 2021

(51) Int. Cl.
*G06F 21/71* (2013.01)
*G06F 11/36* (2006.01)
(Continued)

(52) U.S. Cl.
CPC .......... *G06F 21/71* (2013.01); *G06F 11/3656* (2013.01); *G06F 21/31* (2013.01); *G06F 21/79* (2013.01)

(58) Field of Classification Search
CPC ...... G06F 21/71; G06F 11/3656; G06F 21/31; G06F 21/79; G06F 21/629; G06F 11/3648
See application file for complete search history.

(56) References Cited

U.S. PATENT DOCUMENTS 5,889,988 A * 3/1999 Held ............... G06F 11/3664
714/E11.21
9,372,768 B2 * 6/2016 Conner ............ G06F 11/3024
(Continued)

FOREIGN PATENT DOCUMENTS

CN     105404559 A  *  3/2016 .......... G06F 11/2236
GB       2487575 A  *  8/2012 .............. G06F 11/36
(Continued)

OTHER PUBLICATIONS

Kevin Gibb, "A Look at Metal eFuses," EE Times, Aug. 15, 2011, 15 pages total.

(Continued)

*Primary Examiner* — Sher A Khan
(74) *Attorney, Agent, or Firm* — Trop, Pruner & Hu, P.C.

(57) ABSTRACT

A processor that was manufactured by a manufacturer comprises privileged debug operational circuitry, a debug restriction fuse, a credential store, a credential of the manufacturer in the credential store, and debug control circuitry. The debug restriction fuse is a one-time programmable fuse. The debug control circuitry is to automatically restrict access to the privileged debug operational circuitry, based on the debug restriction fuse. The processor may also include public debug operational circuitry, a prevent-unauthorized-debug (PUD) fuse, and an undo-PUD fuse. When the PUD fuse is set and the undo-PUD fuse is clear, the debug control circuitry may respond to an attempt by a debugger to use the public debug operational circuitry by determining whether the debugger is authorized, disallowing access if the debugger is not authorized, and allowing access if the debugger is authorized. Other embodiments are described and claimed.

15 Claims, 12 Drawing Sheets

(51) Int. Cl.
*G06F 21/31* (2013.01)
*G06F 21/79* (2013.01)

(56) References Cited

U.S. PATENT DOCUMENTS

| | | | | |
|---|---|---|---|---|
| 9,665,468 | B2* | 5/2017 | Avudaiyappan | G06F 11/26 |
| 9,995,789 | B2* | 6/2018 | Dewan | G01R 31/3177 |
| 10,078,568 | B1* | 9/2018 | Staler | G06F 11/263 |
| 10,129,232 | B1* | 11/2018 | Phuong | G06F 11/362 |
| 2004/0221271 | A1* | 11/2004 | Zeman | G06F 11/362 |
| | | | | 717/127 |
| 2005/0091520 | A1* | 4/2005 | Khan | G06F 11/3648 |
| | | | | 717/125 |
| 2008/0282087 | A1* | 11/2008 | Stollon | G01R 31/318544 |
| | | | | 713/171 |
| 2015/0331043 | A1 | 11/2015 | Sastry et al. | |
| 2016/0070630 | A1* | 3/2016 | Williams | G06F 11/3648 |
| | | | | 714/33 |
| 2016/0179646 | A1* | 6/2016 | Neve De Mevergnies | G06F 11/27 |
| | | | | 714/30 |
| 2019/0007212 | A1 | 1/2019 | Neve de Mevergnies et al. | |

FOREIGN PATENT DOCUMENTS

| | | | | |
|---|---|---|---|---|
| JP | 3077627 | B2 * | 8/2000 | |
| JP | 2013542498 | A * | 11/2013 | G06F 11/2236 |

OTHER PUBLICATIONS

Intel Corporation, "Intel SVT Closed Chassis Adapter," Oct. 28, 2019, 2 pages total.
Larry Traylor, "Guide To Intel® Debug and Trace," Asset Inter Tech, 2008, 25 pages total.
Wikipedia, "IBM eFUSE," https://en.wikipedia.org/wiki/IBM_eFUSE, Sep. 30, 2019, 2 pages total.
Weekly Geekly, "JTAG To Every Home: Full Access Via USB," https://weekly-geekly.github.io/articles/341946/index.html, Oct. 28, 2019, 11 pages total.
Maxim Goryachy, et al., "Where There's a JTAG, There's a Way: Obtaining Full System Access Via USB," Oct. 20, 2017, 4 pages total.

* cited by examiner

TECHNOLOGY FOR CONTROLLING ACCESS TO PROCESSOR DEBUG FEATURES

TECHNICAL FIELD

The present disclosure pertains in general to data processing systems and in particular to technology for controlling access to processor debug features.

BACKGROUND

A central processing unit (CPU) may be manufactured by a supplier and provided to a builder. The builder may combine the CPU with other components to create a data processing system. A customer or consumer may then obtain the data processing system from the builder, and the consumer may use the data processing system for productive purposes. Alternatively, the builder may keep and use the data processing system. The CPU may include debug features to facilitate debugging of the CPU. A CPU may also be referred to as a processor. Other types of processors may also include debug features.

For purposes of this disclosure, the manufacturer of a processor may be referred to as the supplier. The entity (e.g., the person or company) that assembles the processor into a data processing system may be referred to as the builder. And the entity that ultimately uses the data processing system may be referred to as the consumer. And in some cases, one entity may be both the builder and the consumer.

To utilize debug features in the processor of a data processing system, the consumer may connect a debug host to the data processing system, and the consumer may then use the debug host to access the debug features. However, debug features may be used to access sensitive information and/or to affect operation of the processor. Consequently, the debug features in a conventional processor may pose a security risk.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As indicated above, the debug features in a conventional processor may present a security risk. The present disclosure introduces technology for controlling access to processor debug features. In particular, the technology described herein enables a builder of a data processing system to set one or more options for controlling access to certain debug features. For instance, as described in greater detail below, the builder may configure the processor in such a way as to prevent the supplier of the processor from accessing some or all debug features of the processor. In addition or alternatively, the builder may configure the processor in such a way as to only allow authorized debuggers to access some or all debug features.

Figure 1:
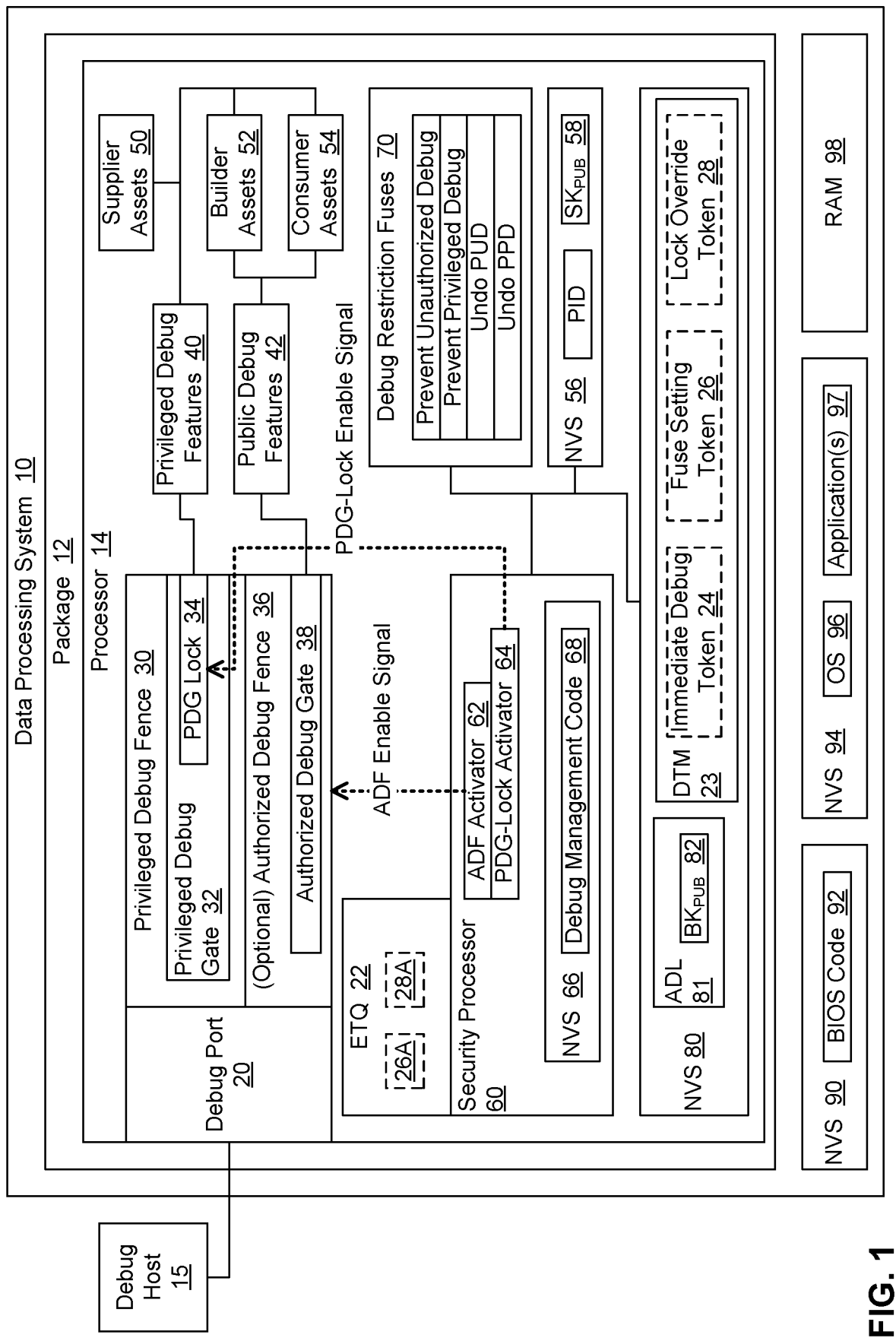
FIG. 1 is a block diagram of an example embodiment of a data processing system with technology for controlling access to processor debug features.

FIG. 1 is a block diagram of an example embodiment of a data processing system 10 with technology for controlling access to processor debug features. Data processing system 10 is a hypothetical system, with various hypothetical components and features to illustrate the technology introduced herein. In particular, data processing system 10 includes a semiconductor package 12 with at least one die containing circuitry to implement a CPU 14 that includes various debug features. CPU 14 may also be referred to as processor 14. However, in alternative embodiments, other types of processors (e.g., graphics accelerators, computer vision accelerators, field programmable gate arrays, etc.) may include the same kinds of debug features.

Processor 14 includes various processing resources. For instance, processor 14 may include one or more cores, each of which may contain one or more arithmetic logic units (ALUs), cache memory, various registers, etc. Data processing system 10 also includes other components coupled to processor 14, such as non-volatile storage (NVS) 90, NVS 94, and random access memory (RAM) 98. NVS 90 and 94 may include software that is loaded into RAM 98 (and/or into processor cache) for execution. In the embodiment of FIG. 1, NVS 90 includes boot code to implement features such as a basic input/output system (BIOS). Accordingly, the boot code may be referred to as "BIOS code" 92. NVS 94 includes an operating system (OS) 96 that runs on top of the BIOS. NVS 94 may also include an application 97 (or multiple applications) which run on top of OS 96. In other embodiments, a data processing system may include fewer NVS components or more NVS components. For instance, BIOS code, an OS, and/or one or more applications may reside in a single NVS component.

However, FIG. 1 focuses primarily on the components within processor 14 that cooperate to provide debug features that a debug host 15 may use to debug processor 14. Those components may be referred to in general as "debug circuitry." A subset of the components in the debug circuitry are circuits which are designed to provide debug functionality (e.g., the ability to interact with supplier assets, with builder assets, or with consumer assets). The circuits in that subset may be referred to in general as "debug operational circuitry." Accordingly, debug features may also be referred to as "debug operational circuitry." Another subset of the components in the debug circuitry are circuits which are designed to control access to the debug operational circuitry (i.e., to the debug features). The circuits in that subset may be referred to in general as "debug control circuitry." In other words, the "debug control circuitry" includes the debug circuitry components for setting and enforcing access restrictions to limit access to debug features.

In the embodiment of FIG. 1, the debug control circuitry includes various NVS components, such as NVS 56, NVS 66, and NVS 80. The supplier of processor 14 may load a processor identifier (PID) into NVS 56. In alternative embodiments, a supplier may store a PID in a processor by setting fuses in the processor or by using any other suitable approach. Also, the supplier may store a credential for the supplier in NVS 56. For instance, that credential may be a public key that belongs to the supplier (illustrated in FIG. 1 as $SK_{PUB}$ 58, with $SK_{PUB}$ denoting "supplier key, public"). Accordingly, NVS 56 may be referred to as a "credential store." As described in greater detail below, processor 14 may include one or more additional credential stores, as well as one or more token stores for storing debug tokens.

Also, processor 14 includes a security processor 60 that includes NVS 66 to contain firmware to be executed by security processor 60. In particular, the supplier stores debug management code 68 in NVS 66. When security processor 60 subsequently executes debug management code 68, that firmware enables security processor 60 to control access to the various debug features in processor 14. Accordingly, security processor 60 is also part of the debug control circuitry. A security processor may also be referred to as a "security engine" or a "manageability engine."

In alternative embodiments, some of the debug circuitry (including some of the debug control circuitry) may reside in a separate integrated circuit and/or in a separate package from the processor. For instance, some of the debug circuitry (including some of the debug control circuitry) could reside in a platform controller hub (PCH) that is connected to a CPU.

In the embodiment of FIG. 1, the debug circuitry includes at least one debug port 20. For example, a processor may feature a test access port (TAP) connection that provides for debug communications according to Joint Test Action Group (JTAG) protocol. In addition or alternatively, the processor may be mounted to a circuit board that includes a debug port with connections to the processor. In addition or alternatively, the processor may be mounted to a circuit board that includes connections between the processor and an externally accessible debug port, such as a universal serial bus (USB) port that supports debug communications.

Debug host 15 may connect to debug port 20 via a debug probe. Debug host 15 may then attempt to access debug features via debug port 20. For purposes of this disclosure, an entity that is attempting to access debug features may be referred to as a debugger. For instance, debug host 15 may be referred to as a debugger. Also, the operator of debug host 15 may be referred to as a debugger.

Also, the assets to be accessed via debug port 20 may be categorized according to which types of debuggers should generally be allowed to access those assets. In particular, processor 14 includes (a) supplier assets 50 which should only accessible to the supplier; (b) builder assets 52 which should be accessible to the builder and, in some circumstances, to the supplier; and (c) consumer assets 54 which should be accessible to the consumer and, in some circumstances, to the builder and/or to the supplier. For instance, supplier assets 50 may include circuitry for overwriting one or more fuse arrays, circuitry for enabling or disabling reserved cores, circuitry for enabling or disabling reserved memory channels, circuitry for overwriting internal register states, etc. Builder assets 52 may include circuitry for controlling CPU run control or probe mode, circuitry to provide hardware tracing of external links, circuitry to provide status information for a boot controller block and for other blocks within processor 14. Consumer assets 54 may include data within data processing system 10 that the consumer considers to be sensitive and/or confidential, such as a database of usernames and passwords for users of a banking application on data processing system 10, application data (e.g., bank account balances) pertaining to those users, personal media, e-mail, medical information, browsing history, location date, etc.

In the embodiment of FIG. 1, the debug features include two different classes of debug features: privileged debug features 40 and public debug features 42. In other words, the debug operational circuitry includes privileged debug operational circuitry and public debug operational circuitry. However, in alternative embodiments, a processor may include more than two classes of debug features. For instance, some debug features may be accessible only to the supplier, some may only be accessible to authorized debuggers, and some may be accessible to any debugger.

In general, public debug features 42 are debug features that should be accessible to the builder and to the consumer. By contrast, privileged debug features 40 are debug features that should only be accessible to the supplier (i.e., to the manufacturer of processor 14). Accordingly, as illustrated in FIG. 1, public debug features 42 only provide access to builder assets 52 and consumer assets 54. By contrast, privileged debug features 40 provide access to supplier assets 50. In the embodiment of FIG. 1, privileged debug features 40 also provide access to builder assets 52 and consumer assets 54. However, as described in greater detail below, the builder may disable the supplier's access to privileged debug features 40.

As indicated above, the debug control circuitry includes NVS 56, security processor 60 (including NVS 66), and NVS 80. Also, as indicated above, processor 14 includes various credential stores and debug token stores. For instance, in the embodiment of FIG. 1, the NVS 80 includes an authorized debugger list (ADL) 81 to store credentials for authorized debuggers, and a debug token mailbox (DTM) 23 to store debug tokens. Processor 14 also includes an early token queue (ETQ) 22 for storing early debug tokens. For instance, as described in greater detail below, when debuggers inject debug tokens via debug port 20, processor 14 stores those tokens in DTM 23. And, as explained more fully below, in some cases, processor 14 may copy a debug token from DTM 23 to ETQ 22. Processor 14 also includes various debug restriction fuses 70. Consequently, the debug control circuitry of processor 14 also includes ETQ 22 and debug restriction fuses 70 (in addition to other components, such as DTM 23, ADL 81, etc.).

In the embodiment of FIG. 1, ADL 81 and DTM 23 reside in NVS 80, and other token stores and/or credential stores reside in other NVS components, such as NVS 56 and ETQ 22. However, in other embodiments, the token stores and credential stores may be distributed differently. For instance, DTM 23 may reside in NVS 90, to be pulled in to processor 14 as necessary.

Different consumers of data processing systems may have different security requirements. For instance, one consumer may require easy access to public debug features 42. A second consumer may require public debug features 42 be protected, such that only authorized debuggers are able to access those features. A third consumer may require privileged debug features 40 to be disabled.

In the embodiment of FIG. 1, before processor 14 is shipped to the builder, the debug control circuitry in processor 14 has already been configured to establish a privileged debug fence (PDF) 30 which prevents any debugger except for the supplier from accessing privileged debug features 40. In particular, processor 14 may include a privileged debug gate (PDG) 32 which (at least in some circumstances) allows the supplier to access privileged debug features 40, while privileged debug fence 30 prevents any other debugger from access privileged debug features 40. For instance, as indicated above, the supplier may store a credential for the supplier (e.g., $SK_{PUB}$ 58) in NVS 56 in processor 14 before shipping processor 14 to the builder. Privileged debug gate 32 may subsequently use that credential to determine whether a debugger is the supplier. For instance, when the supplier subsequently attempts to use privileged debug features 40, the supplier may provide a debug token that has been signed with the supplier's corresponding private key ($SK_{PRIV}$), and the debug control circuitry may use $SK_{PUB}$ from NVS 56 to authenticate that signature as belonging to the supplier. Thus, the debug control circuitry in processor 14 for controlling access to debug features includes privileged debug fence 30 and privileged debug gate 32, and privileged debug gate 32 is based on a supplier credential in NVS 56. Storage components in processor 14 for store credentials (e.g., NVS 56 and NVS 80) may be implemented as integrity-protected storage. In some embodiments, a data processing system may use on-die fuses to store the supplier' credentials. In some embodiments, a data processing system may use on-die fuses or storage outside of the processor to store the builder's credentials. For instance, a data processing system may use off-die fuses that are verified for integrity by on-die debug management code.

Before the supplier ships processor 14 to the builder, the supplier may use privileged debug features 40 to verify that processor 14 operates properly. Also, after the builder assembles processor 14 into data processing system 10, the builder may use public debug features 42 to verify that processor 14 operates properly. In different scenarios, the builder may then either ship data processing system 10 to the consumer without setting additional debug access restrictions, or the builder may set one or more debug access restrictions before shipping data processing system to the consumer.

In a first example scenario, the builder ships data processing system 10 to the consumer without setting additional debug access restrictions. Consequently, when the consumer receives data processing system 10, processor 14 is configured to have relatively few debug security restrictions. In particular, the debug control circuitry imposes no access restrictions on public debug features 42, but the debug control circuitry only allows the supplier to access privileged debug features 40.

If the consumer subsequently experiences problems with data processing system 10, the consumer may use public debug features 42 to troubleshoot the problems. If the consumer is unable to resolve the problems, the consumer may then return data processing system 10 to the builder for repair or replacement. The builder may then use public debug features 42 to troubleshoot the problems. If the builder is unable to resolve the problems, the builder may then return processor 14 to the supplier. The supplier may then use privileged debug features 40 to troubleshoot the problems.

However, in the embodiment of FIG. 1, the technology for controlling access to the debug features also provides for additional security protections and options. The builder may use those additional security protections and options to prevent the supplier from accessing privileged debug features 40. In addition or alternatively, the builder may use those additional security protections and options to restrict access to public debug features 42.

In particular, the additional security protections and options include a PDG lock 34 that, when set by the builder, prevents privileged debug gate 32 from authenticating the supplier, thereby preventing the supplier from using privileged debug features 40. The additional security protections and options also include an optional authorized debug fence (ADF) 36 and an authorized debug gate 38 which, when active, work together to restrict access to public debug features 42 so that only authorized debuggers may access those features.

In a second example scenario, the builder configures the additional security protections and options to disable privileged debug features 40 and to activate authorized debug fence 36 before shipping data processing system 10 to the consumer (or otherwise deploying data processing system 10 for productive work). In particular, the builder sets PDG lock 34, to prevent the supplier from using privileged debug features 40, as indicated above.

The builder also activates authorized debug fence 36, to restrict access to public debug features 42. When authorized debug fence 36 is active, authorized debug fence 36 prevents any debugger from accessing public debug features 42 unless authorized debug gate 38 recognizes that debugger as an authorized debugger. In addition, the builder stores a credential for each authorized debugger in NVS 80 in processor 14, including a credential for the builder itself. As indicated above, the collection of credentials for authorized debuggers may be referred to as ADL 81. Authorized debug gate 38 may then use the credentials in ADL 81 to determine whether a debugger is authorized to use public debug features 42. For instance, the credential for the builder may be a public key that belongs to the builder (illustrated in FIG. 1 as $BK_{PUB}$ 82, with $BK_{PUB}$ denoting "builder key, public"). And when the builder subsequently attempts to use public debug features 42, the builder may provide a debug token that has been signed with the builder's corresponding private key ($BK_{PRIV}$). Furthermore, the first entry in ADL 81 may be reserved for the builder, so that the debug control circuitry can determine whether certain types of tokens (e.g., fuse setting tokens and lock override tokens) came from the builder in particular.

Processor 14 also includes various one-time programmable fuses (or e-fuses) that the builder can set to activate and deactivate PDG lock 34, and to activate and deactivate authorized debug fence 36. Those e-fuses may be referred to in general as "debug restriction fuses 70." In the embodiment of FIG. 1, debug restriction fuses 70 include a prevent privileged debug (PPD) fuse to activate PDG lock 34, and a prevent unauthorized debug (PUD) fuse to activate authorized debug fence 36. In addition, debug restriction fuses 70 include an undo-PPD fuse to deactivate PDG lock 34, and an undo-PUD fuse to deactivate authorized debug fence 36. For purposes of this disclosure, an e-fuse to set a debug access restriction may be referred to as a "debug control fuse," and an e-fuse to counteract or undo a debug access restriction may be referred to as an "undo fuse."

If the PPD fuse is set and the undo-PPD fuse is not set, a PDG lock actuator 64 in security processor 60 activates PDG lock 34 by sending a PDG-lock enable signal, as illustrated by one of the dashed lines in FIG. 1. Similarly, if the PUD fuse is set and the undo-PUD fuse is not set, an ADF actuator 62 in security processor 60 activates authorized debug fence 36 by sending an ADF enable signal, as illustrated by the other dashed line in FIG. 1. Thus, PDG lock 34 and authorized debug fence 36 are active if the respective debug restriction fuses have been set, and the corresponding undo fuses have not been set. In other words, those restrictions are active if the respective fuses have been set and not undone. For purposes of this disclosure, an e-fuse (e.g., the PUD fuse) may be referred to as "undone" if the corresponding undo e-fuse (e.g., the undo-PUD fuse) has been set, and as "not undone" if the corresponding undue e-fuse (e.g., the undo-PUD fuse) has not been set.

As indicated above, when a debugger attempts to access debug features, the debugger may inject a debug token into DTM 23 via debug port 20. Also, the debug control circuitry may recognize and process various different classes or categories of debug tokens. Those classes may include immediate debug tokens and delayed debug tokens. Immediate debug tokens are tokens with commands that can be executed and completed immediately (i.e., without resetting processor 14). For example, the payload of an immediate debug token may include a debug command to open and read a status register or a general-purpose register (GPR), since such commands can be processed without resetting processor 14.

Delayed debug tokens are tokens that are injected in one boot cycle, and then completed in the next boot cycle. For instance, in one embodiment or scenario, a processor executes debug tokens for setting debug restriction fuses as delayed debug tokens. In particular, as described in greater detail below, processor 14 may use two boot cycles to complete a debug command to set a debug restriction fuse, with that new setting of the fuse taking effect on the third boot cycle. A debug token with a command to set one of the debug restriction fuses may be referred to as a "fuse setting token."

The debug control circuitry may automatically delete debug tokens from DTM 23 after the debug control circuitry has processed those tokens. Also, when processing tokens from DTM 23, the debug control circuitry may copy delayed debug tokens to ETQ 22, for further processing upon reboot, as indicated above. The debug control circuitry may leave some or all delayed debug tokens in ETQ 22 after processing them. Since delayed debug tokens are not automatically deleted from ETQ 22 after being processed, delayed debug tokens may also be referred to as "persistent debug tokens."

Persistent debug tokens are debug tokens that remain in processor 14 indefinitely. For instance, as described in greater detail below, the builder may use a persistent token to override PDG lock 34, to enable the supplier to subsequently access privileged debug features 40. A token to override PDG lock 34 may be referred to as a "lock override token." In other words, a lock override token is a token with a debug command that enables a privileged debugger to access privileged debug features 40 even though the PPD fuse has been set and the undo-PPD fuse has not been set.

In FIG. 1, DTM 23 includes an example immediate debug token 24, an example fuse setting token 26, and an example lock override token 28.

In one embodiment, the debug control circuitry uses more than one boot cycle to process some types of tokens, as indicated above. For instance, when the debug control circuitry process fuse setting token 26, during a first boot cycle (i.e., during the boot cycle in which the debugger injected fuse setting token 26 into DTM 23), the debug control circuitry copies fuse setting token 26 to ETQ 22. As indicated above, early token queue 22 is a storage area for storing debug tokens that are to be processed early in the boot process, before any debug tokens from DTM 23. Accordingly, the debug tokens within ETQ 22 may be referred to as "early debug tokens." For instance, as illustrated in FIG. 1, during a first boot cycle, in response to a debugger injecting fuse setting token 26 into DTM 23, the debug control circuitry may copy fuse setting token 26 into ETQ 22, and that copy of the token may be referred as "early debug token" 26A or "fuse setting token" 26A. The debug control circuitry may then reset processor 14, and in the next boot cycle, the debug control circuitry may process early debug token 26A before processing any debug tokens from DTM 23.

Additional details for an example process for handling debug tokens are provided below with regard to FIGS. 4A-4D and FIG. 5.

Figure 2:
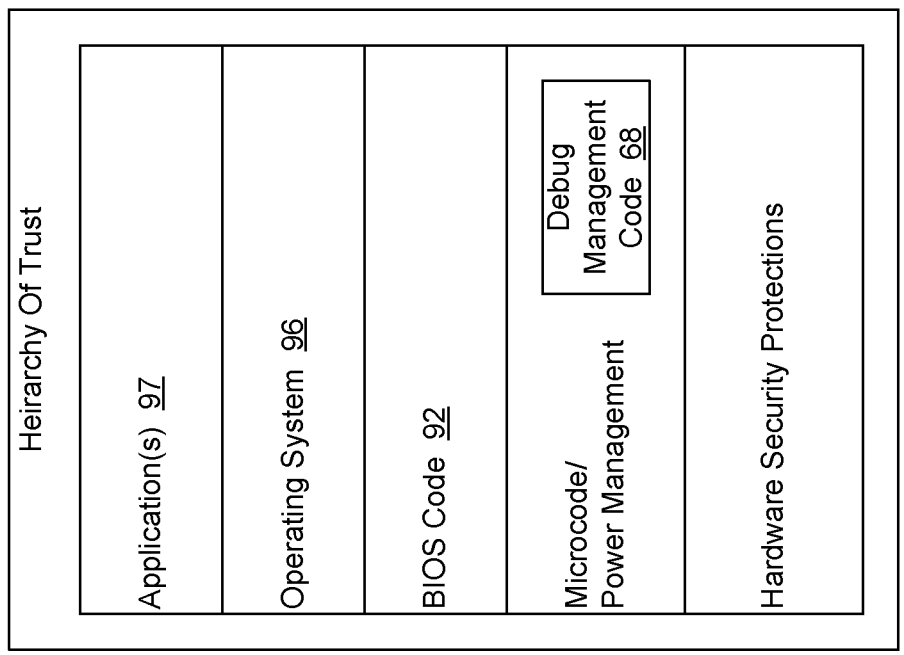
FIG. 2 is a block diagram of illustrating the hierarchy of trust for the data processing system of FIG. 1.

FIG. 2 is a block diagram of illustrating the hierarchy of trust for data processing system 10. The hardware security protections built in to components such as processor 14 form the lowest level of that hierarchy. The next level is the firmware that is stored in components such as processor 14. As indicated above, that firmware may include debug management code 68. The next level of the hierarchy is the BIOS (e.g., BIOS code 92), followed next by OS 96, and then by the application(s) 97.

Figure 3:
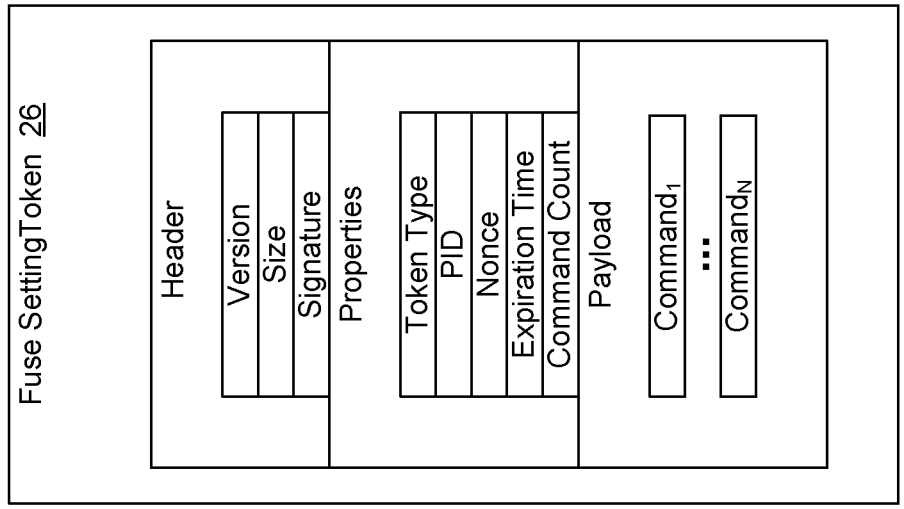
FIG. 3 is a block diagram of an example embodiment of a debug token.

FIG. 3 is a block diagram of an example embodiment of fuse setting token 26. Other types of tokens may be organized in the same way. As illustrated, fuse setting token 26 includes a header section, a properties section, and a payload section. The header section includes fields for a version identifier, a size indication, and a signature. The creator of fuse setting token 26 (e.g., the builder), may create the signature by hashing the rest of the token and using the creator's private key to sign the hash, for instance.

The properties section includes fields for a token type, a PID, a nonce, an expiration time, and a command count. The payload section includes one or more debug commands.

FIGS. 4A-4D present a flowchart of some aspects of an example embodiment of a process for controlling access to processor debug features. That process is described with regard to an example scenario involving data processing system 10. In particular, that scenario involves the builder setting debug access restrictions according to the second example scenario described above.

Figure 4A:
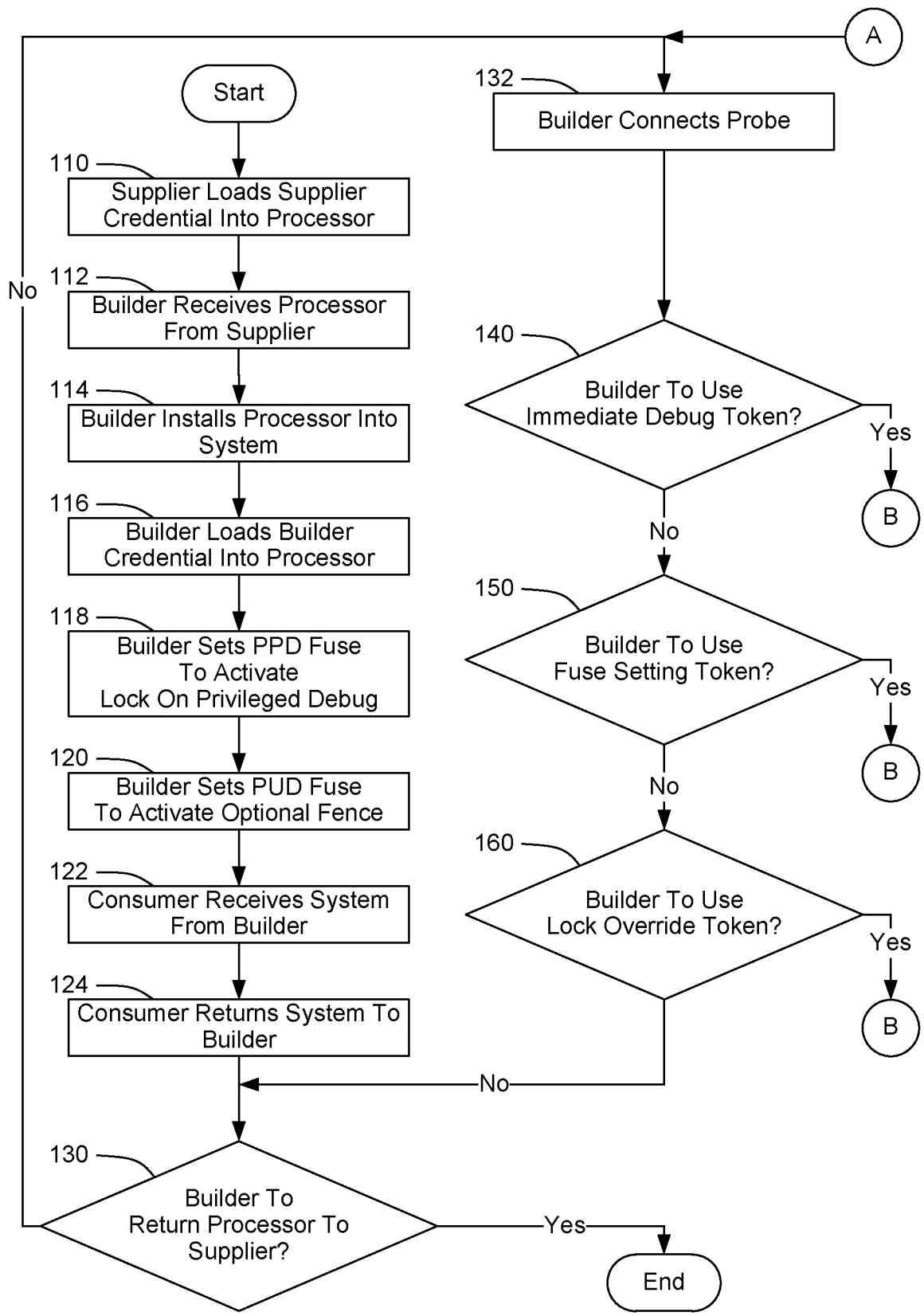
FIGS. 4A-4D present a flowchart of some aspects of an example embodiment of a process for controlling access to processor debug features.

The process of FIG. 4A starts with the supplier preparing processor 14 for sale. As part of that preparation process, the supplier loads a credential for the supplier into processor 14, to enable the supplier to use privileged debug features 40, as shown at block 110. For instance, the supplier may load $SK_{PUB}$ 58 into NVS 56. The supplier may then use debug tokens signed with the supplier's corresponding private key ($SK_{PRIV}$) to use privileged debug features 40, to verify that processor 14 operates properly. As shown at block 112, the supplier then delivers processor 14 to the builder.

As shown at block 114, the builder then installs processor 14 into data processing system 10. The builder may then use debug tokens to access public debug features 42, to verify that processor 14 operates properly. And since the builder has not yet activated authorized debug fence 36, those tokens need not be signed.

As shown at block 116, the builder then loads a credential for the builder into processor 14. For instance, the builder may load $BK_{PUB}$ 82 into NVS 80 as the first entry in ADL 81. As shown at block 118, the builder may then set the PPD fuse to activate PDG lock 34, thereby disabling privileged debug (i.e., preventing the supplier from accessing privileged debug features 40). As shown at block 120, the builder may then set the PUD fuse, to activate authorized debug fence 36. Additional details on the process for setting debug restriction fuses are provided below with regard to FIGS. 4B and 4D.

The builder may then use debug tokens signed with the builder's corresponding private key ($BK_{PRIV}$) to use public debug features 42, to verify that processor 14 operates properly. The builder may also load OS 96 and application(s) 97 into data processing system 10, or the consumer may load OS 96 and/or application(s) 97 after receiving data processing system 10.

As shown at block 122, the builder may then deliver data processing system 10 to the consumer (or otherwise deploy data processing system for productive work). In the scenario of FIG. 4A, when the consumer uses data processing system 10, the consumer experiences problems with data processing system 10. Consequently, as shown at block 124, the consumer returns data processing system 10 to the builder. The builder may then select from various different options. Those options may include (a) using public debug features 42 to troubleshoot the problems, (b) if unable to resolve the problems, returning processor 14 to the supplier, and (c) before returning processor 14 to the supplier, (i) modifying the settings in processor 14 to enable the supplier to use privileged debug features 40 to troubleshoot the problems and (ii) clearing any sensitive data from builder assets 52 and consumer assets 54.

As shown at block 130, if the builder decides to return processor 14 to the supplier, the process of FIG. 4A may end with the builder removing processor 14 from data processing system 10 and sending processor 14 to the supplier. The supplier may then handle processor 14 as described in greater detail below with regard to FIG. 5.

However, before deciding to return processor 14 to the supplier, the builder may want to try various debug options and/or change various debug restrictions. In that case, as shown at block 132, the builder may connect a probe of debug host 15 to debug port 20, if the probe is not already connected. For instance, in some scenarios, the process automatically returns to FIG. 4A via page connector A after the debug control circuitry has processed a debug token and that token has triggered a reset of processor 14. In such a scenario, the debug probe may already be connected to debug port 20. Furthermore, in some embodiments, a probe may remain connected indefinitely to a debug port, the probe may be inactive by default, and the probe may be remotely activatable. For instance, a server rack may contain multiple data processing systems connected to a board management controller (BMC), and the BMC may have a debug probe connected to each of those data processing systems. Also, the BMC may allow a remote operator to activate and deactivate each of those probes.

Figure 4B:
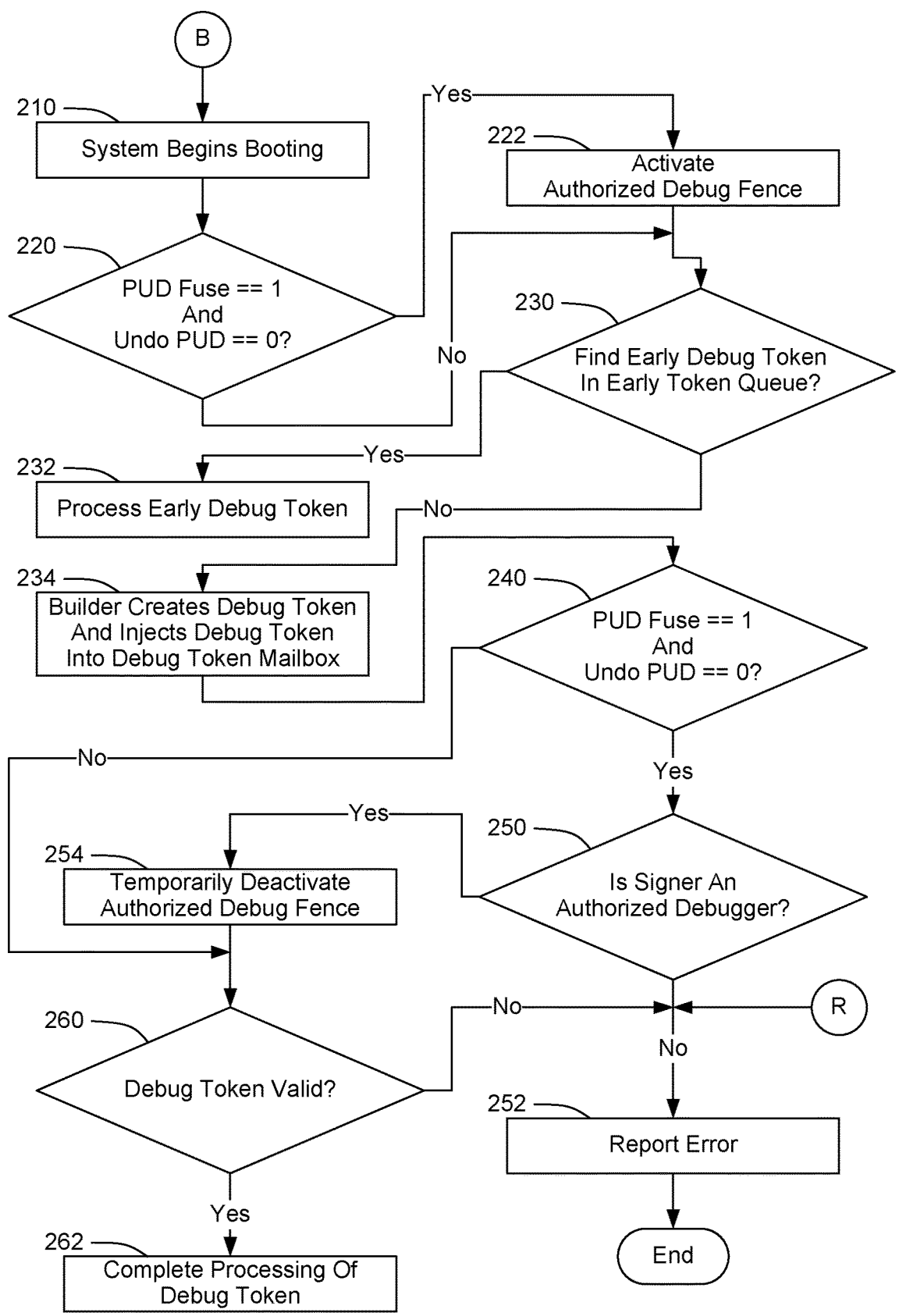

As shown at block 140, if the builder has decided to use an immediate debug token to troubleshoot processor 14, the process of FIG. 4A may pass through page connecter B to FIG. 4B. As indicated above, an immediate debug token is token with commands that can be executed and completed immediately (i.e., without resetting processor 14).

FIG. 4B illustrates a scenario in which debuggers inject debug tokens during the boot process. In particular, the debug control circuitry provides an authentication window that closes before BIOS code 92 loads, and the debug control circuitry does not allow debug tokens to be injected after the authentication window closes. However, in other embodiments, the debug control circuitry may allow debuggers to inject debug tokens after boot, to be processed upon reboot. For instance, if the builder is also the consumer, the builder could choose to configure the processor to allow debug tokens to be injected after the OS has been launched.

At the start of the process of FIG. 4B, processor 14 starts booting, as shown at block 210. For instance, the builder may have turned on data processing system 10 after connecting a debug probe to debug port 20, or the process may be returning to FIG. 4B after a debug command has cause a reset of processor 14.

Also, the process for processing debug tokens involves the debug control circuitry, very early in the boot process, determining whether the PUD fuse has been set and not undone, as shown at block 220. If that condition is found to be true, the debug control circuitry uses ADF actuator 62 to activate authorized debug fence 36, as shown at block 222. If that condition is not true, or if it is and authorized debug fence 36 has been activated, the debug control circuitry may then determine whether an early debug token has already been stored in ETQ 22, as shown at block 230. If such token is found, the debug control circuitry may then process the early debug token, as shown at block 232. Additional details concerning the processing of early debug tokens are provided below with regard to FIG. 4D.

In addition, the debug control circuitry may also check the PPD fuse and the undo-PPD fuse before processing early debug tokens. However, to avoid unnecessary complexity for FIGS. 4A-4D, those operations are shown in FIG. 5, with regard to the use of debug features by the supplier of processor 14 after the builder has returned processor 14 to the supplier.

Referring again to block; 230 in FIG. 4B, if no early debug token is found, the builder may then create an immediate debug token and inject that token into DTM 23 via debug port 20, as shown at block 234. For instance, as part of the process for creating immediate debug token 24, the builder may read the PID from processor 14 and include that PID in the token. Also, if the token is to be used when the PUD fuse has been set and not undone, the builder may use the builder's private key to sign the token. Accordingly, in FIG. 1, immediate debug token 24 depicts an immediate debug token that the builder has injected into DTM 23.

As shown at block 240, how the debug control circuitry processes that token depends on whether the PUD fuse has been set and not undone. If the PUD fuse has not been set, or if it has been set and undone, the debug control circuitry may execute the commands in immediate debug token 24 after validating aspects of immediate debug token 24 such as the PID and the expiration date, but without determining whether the debugger is authorized, as shown at blocks 260 and 262. Those commands may use public debug features 42 to access builder assets 52 and/or consumer assets 54, for instance.

However, if the PUD fuse has been set and not undone, the process passes from block 240 to block 250, with the debug control circuitry verifying the builder signature in immediate debug token 24 and checking ADL 81 to verify that the debugger which created immediate debug token 24 is an authorized debugger.

As shown at block 252, if the verification fails, the debug control circuitry may report an error, and the process may then end. However, if the verification succeeds, the debug control circuitry may temporarily (until processor 14 is reset) deactivate authorized debug fence 36, as shown at block 254. In other words, the debug control circuitry may open authorized debug gate 38.

As shown at block 260, the debug control circuitry may then validate other aspects of immediate debug token 24, such as the PID and the expiration date. If that validation fails, the debug control circuitry may report an error, as shown at block 242, and the process may end. However, if the validation succeeds, the debug control circuitry may then complete the processing of immediate debug token 24, as shown at block 262.

Figure 4C:
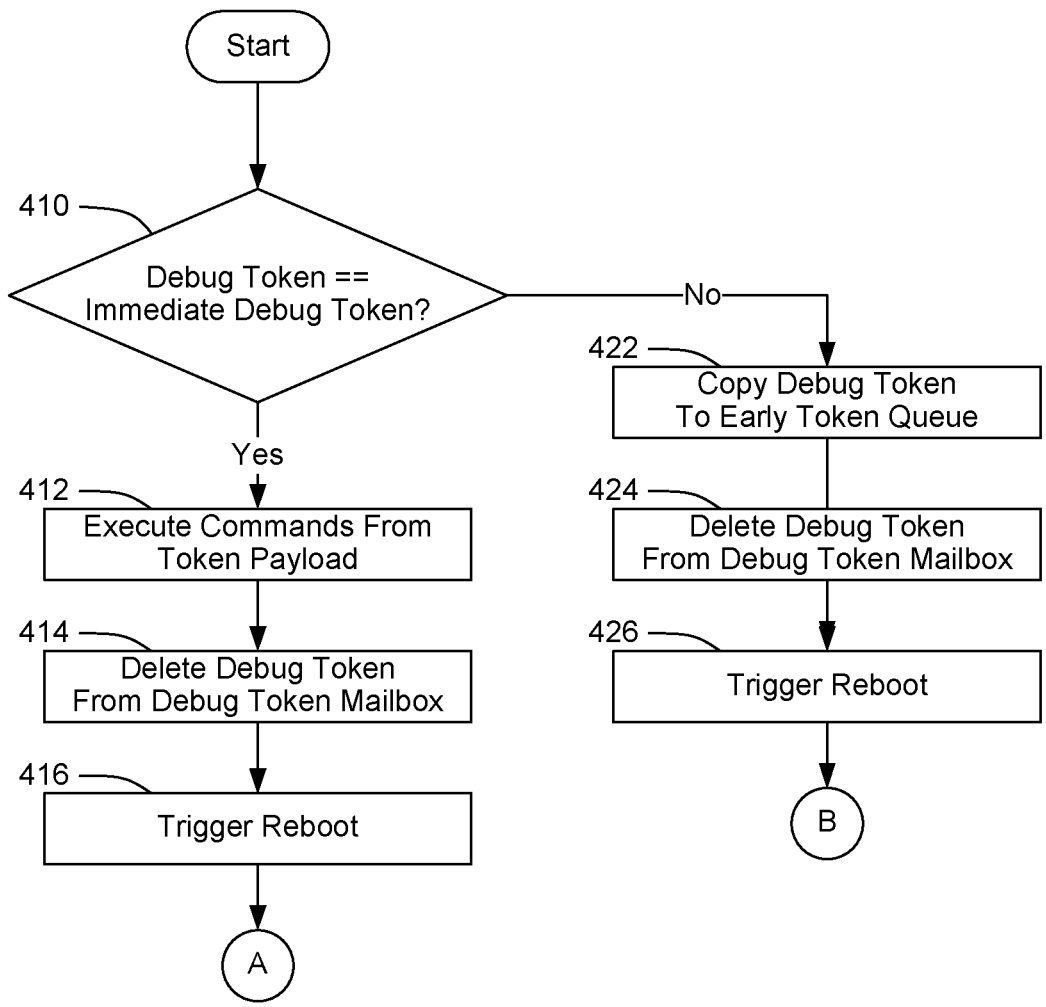
Figure 5:
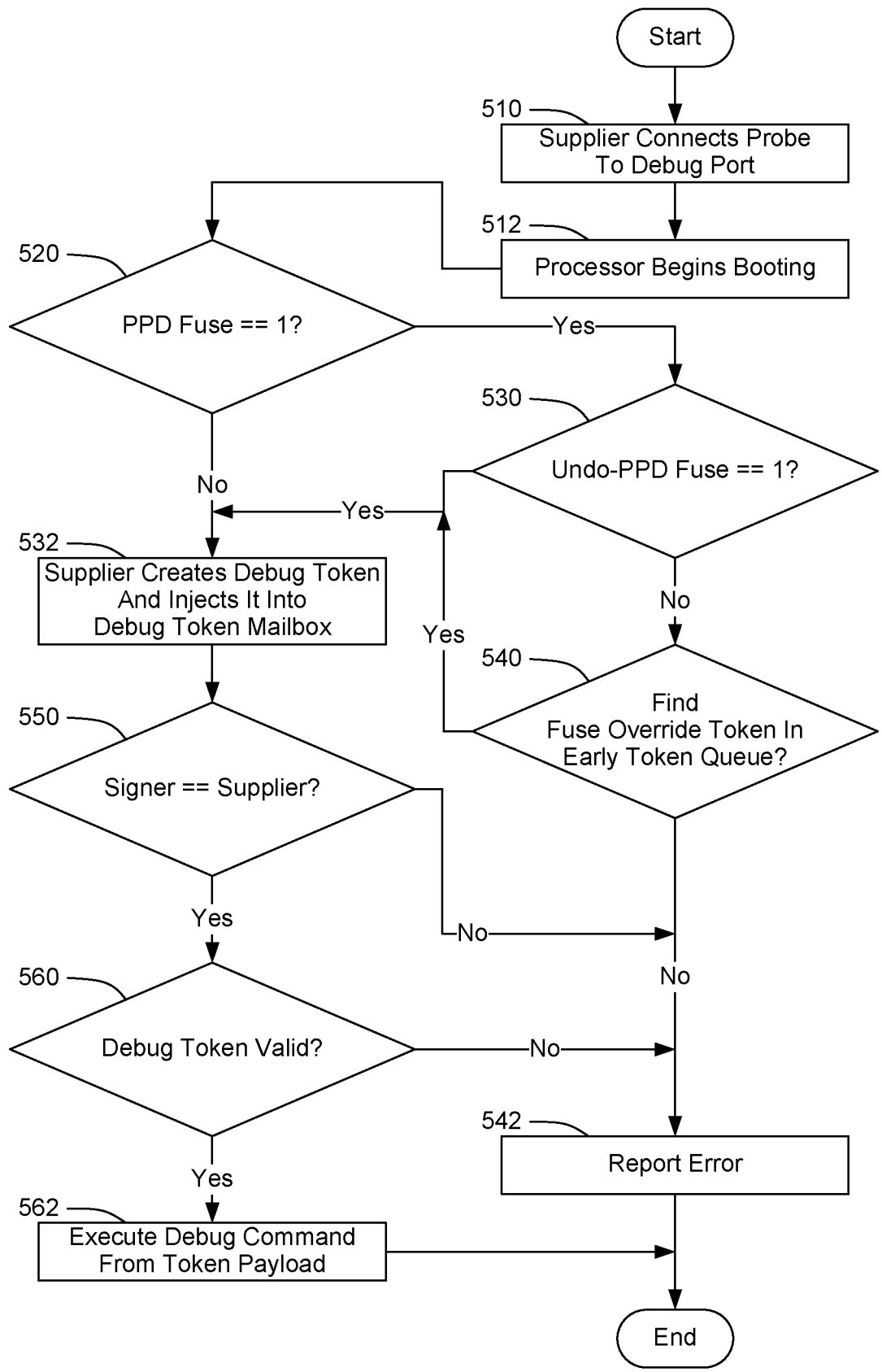
FIG. 5 presents a flowchart of other aspects of an example embodiment of a process for controlling access to processor debug features.

To expand upon operations associated with block 262 of FIG. 4B, FIG. 4C provides additional details for operations used to complete the processing of debug tokens from DTM 23, after those tokens have been validated and authenticate. As shown at blocks 410 and 412 of FIG. 4C, if the token to be processed is an immediate debug token, the debug control circuitry may execute the debug commands in the payload of that token. As shown at block 414, the debug control circuitry may then delete the token from DTM 23. The debug control circuitry may then reset processor 14, as shown at block 416. The process may then return to FIG. 4A via page connector A. The debug control circuitry may thus complete the processing of tokens such as immediate debug token 24.

However, as shown at block 422 of FIG. 4C, if the token is not an immediate debug token, the debug control circuitry may copy the token from DTM 23 to ETQ 22, to be processed as an early debug token in the next boot cycle after processor 14 is reset. In particular, if the debug token is a delayed debug token (e.g., a fuse setting token or a lock override token), the debug control circuitry copies the debug token into ETQ 22 to be processed as an early debug token.

For instance, referring again to the scenario of FIG. 4A, if the builder has not decided to use an immediate debug token, the builder may have decided to use a fuse setting token (which is a delayed debug token). In particular, in the example scenario, the builder has decided to set the undo-PUD fuse after using one or more immediate debug tokens in one or more previous boot cycles. Consequently, the process of FIG. 4A passes from block 150 through page connector B to FIG. 4B.

Also, as indicated above, the PUD and PPD fuses were already set before the builder shipped data processing system to the consumer. Furthermore, to set the PUD fuse and the PPD fuse in the first place, the builder may have used the same kind of process as that described below. And the builder may also use that process to set the undo-PPD fuse.

When the builder has decided to use a delayed debug token to set the undo-PUD fuse, the process of FIG. 4B may operate as indicated above with regard to immediate debug tokens, but at block 234 the builder will create and inject fuse setting token 26 instead of immediate debug token 24. In particular, when the builder creates fuse setting token 26, the builder stores the PID in the properties section of the token, the builder stores a debug command to set the undo-PUD fuse in the payload section of the token, the builder uses its private key to sign the token, etc.

Also, at block 262, the debug control circuitry will complete processing of fuse setting token 26. As indicated above, FIG. 4C provides additional details for operations used to complete the processing of debug tokens from DTM 23 after those tokens have been validated and authenticate as described above. In particular, for fuse setting token 26, the debug control circuitry will decide that the token is not an immediate debug token. Consequently, the process will pass from block 410 to block 422, and the debug control circuitry will copy fuse setting token 26 to ETQ 22 as early debug token 26A. FIG. 1 illustrates one instance of fuse setting token 26 in DTM 23, and a second instance 26A in ETQ 22, with instance 26A to subsequently be processed as an early debug token. As shown at blocks 424 and 426, the debug control circuitry may then delete fuse setting token 26 from DTM 23 and reset processor 14. The process may then return to FIG. 4B via page connector B. As described in greater detail below, the debug control circuitry may then process early debug token 26A during the next boot cycle.

FIG. 4B shows that boot cycle starting with the debug control circuitry determining whether the PUD fuse has been set and not undone. And in the present scenario, that determination is positive, although early debug token 26A is now a fuse setting token that is waiting to be processed as an early debug token. Consequently, the process will pass from block 220 to block 222, with the debug control circuitry activating authorized debug fence 36. And the process will pass from block 230 to block 232, with the debug control circuitry then processing early debug token 26A.

Figure 4D:
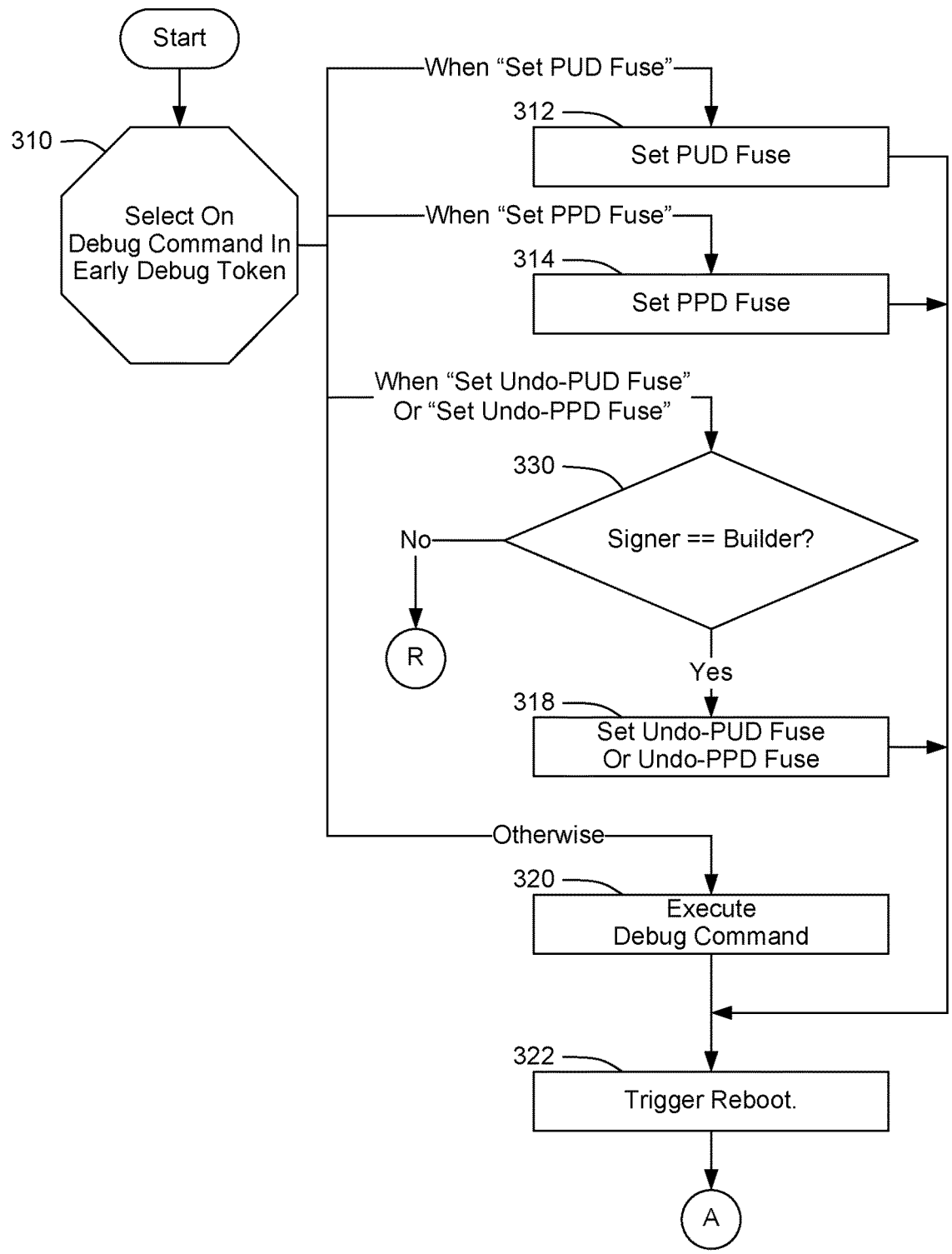

As indicated above, FIG. 4D provides additional details concerning the processing of early debug tokens. As shown at block 310, the process of FIG. 4D starts with the debug control circuitry selecting from among a variety of branches, depending on the debug command in the early debug token. For instance, if the early debug token contains a command to set the PUD fuse, the process passes to block 312, and the debug control circuitry executes that command by setting the PUD fuse. Likewise, if the early debug token contains a command to set the PPD fuse, the process passes to block 314, and the debug control circuitry executes that command by setting the PPD fuse.

However, in the present scenario, the debug command in early debug token 26A is a command to set the undo-PUD fuse. When the command is to set the undo-PUD fuse or to set the undo-PPD fuse, the process may pass to block 330. The debug control circuitry may then check the signature in the debug token, to determine whether the signer is the builder. If the signer is not the builder, the process may pass through page connector R to FIG. 4B, with the debug control circuitry then reporting an error and the process then ending.

However, upon authentication that the signer is the builder, the debug control circuitry may execute the debug command in the token (i.e., setting the undo-PUD fuse or the undo-PPD fuse, as specified in the debug command), as shown at block 318.

However, if the early debug token is not a fuse setting token, the debug control circuitry may execute the command (s) from the early debug token, as shown at block 320. For instance, if the early debug token is a lock override token with a lock override command, the command causes the debug control circuitry to temporarily (until the next reset) deactivate PDG-lock activator 64, thereby deactivate or opening PDG lock 34.

The debug control circuitry may then reset processor 14, as shown at block 322. The process of FIG. 4D may then return to FIG. 4A via page connector A.

In the present scenario, the early debug token was fuse setting token 26A which caused the debug control circuitry to set the undo-PUD fuse. Consequently, whenever processor 14 subsequently boots, the undo-PUD fuse remain set. Consequently, the processor of FIG. 4B will not execute step 222 to activate authorized debug fence 36, and the debug control circuitry may process debug tokens pertaining to public debug features 42 without requiring those tokens to be signed by authorized debuggers.

In one scenario, the builder may then choose to set the undo-PPD fuse, to enable the supplier to subsequently use privileged debug features 40. In that case, the process of FIG. 4A would pass through block 150 again, to be processed basically as indicated above, but for an undo-PPD command, instead of an undo-PUD command.

However, in another example scenario, to enable the supplier to subsequently use privileged debug features 40, instead of deciding to set the undo-PPD fuse, the builder decides to inject a lock override token into processor 14. (As indicated above, lock override tokens are delayed debug tokens.) Consequently, the process of FIG. 4A passes from block 160 to FIG. 4B via page connector B. And during that boot cycle, the builder creates lock override token 28 and injects lock override token 28 into DTM 23, as shown at block 234 of FIG. 4B. And at block 262, the debug control circuitry completes processing of lock override token 28.

And as indicated above, FIG. 4C provides additional details for operations used to complete the processing of debug tokens from DTM 23, as summarized in block 262 of FIG. 4B. And in FIG. 4C, since lock override token 28 is not an immediate debug token, the debug control circuitry will copy lock override token 28 to ETQ 22, as shown at block 422. The instance of lock override token 28 in ETQ 22 may be referred as "early debug token" 28A or "lock override token" 28A. The debug control circuitry may then delete lock override token 28 from DTM 23 and reset processor 14, as shown at blocks 424 and 426. The process may then return to FIG. 4B via page connector B, with processor 14 starting the next boot cycle, as shown at block 210. In that boot cycle, the debug control circuitry may process lock override token 28A before processing any debug tokens from DTM 23, as shown at block 232.

As indicated above, FIG. 4D provides additional details concerning the processing of early debug tokens. In particular, at block 320, the debug control circuitry will execute the debug command(s) from lock override token 28A. In particular, lock override token 28A includes a lock override debug command that causes the debug control circuitry to temporarily deactivate PDG-lock activator 64, thereby deactivating or opening PDG lock 34, so that the supplier can use privileged debug features 40. The debug control circuitry may then reset processor 14, as shown at block 322.

The process may then return to FIG. 4A via page connector A. The builder may then do more debugging, if desired.

If the builder was able to solve the problems without setting the undo-PUD fuse and without setting the undo-PPD fuse, the builder may return data processing system to the consumer. As shown at block 130, if the builder was unable to solve the problems, the process of FIG. 4A may end with the builder returning the processor to the supplier.

The flowchart of FIG. 5 depicts aspects of an example embodiment of a process for controlling access to privileged debug features 40. In particular, FIG. 5 focuses on the operations performed after a builder has returned processor 14 to the supplier. Also, that process is described below in the context of a scenario like the one discussed above in connection with FIGS. 4A-4D. In example scenario for FIG. 5, the consumer returns processor 14 to the builder with the PUD fuse and the PPD fuse set. The builder then uses public debug features 42 to perform some debugging operations. The builder then decides to return processor 14 to the supplier. Consequently, the builder either sets the undo-PPD fuse or injects a lock override token, to enable the supplier to access privileged debug features 40. The builder then return the processor to the supplier.

As shown at block 510, the process of FIG. 5 may then start with the supplier connecting a probe of a debug host to debug port 20. As shown at block 512, the supplier then powers up processor 14. As shown at block 520, the debug control circuitry then determines whether the PPD fuse has been set. If it has, the debug control circuitry determines whether the undo-PPD fuse has been set, as shown at block 530. In effect, if the PPD fuse has been set and not undone, PDG-lock activator 64 activates PDG lock 34.

However, the debug control circuitry then looks for a fuse override token in ETQ 22, as shown at block 540. If ETQ 22 does not contain a fuse override token, PDG lock remains active. Consequently, the debug control circuitry may report an error, as shown at block 542, and the process may then end without the supplier obtaining access to privileged debug features 40.

However, if the undo-PPD fuse has been set, PDG-lock activator 64 will not activate PDG lock 34. Or if there is a fuse override token in ETQ 22, PDG-lock activator 64 will stop activating PDG lock 34.

Consequently, the supplier may create a debug token and inject it into DTM 23, as shown at block 532. The process of creating the debug token may include reading the PID from processor 14, including that PID in the token, and using the supplier's private key to sign the token.

As shown at block 550, the debug control circuitry may then use the signature from the token and $SK_{PUB}$ 58 from NVS 56 to authenticate whether the signer is the supplier. If that authentication succeeds, the debug control circuitry may validate other aspects of the debug token (e.g., the date and PID), as shown at block 560. Upon successful validation, the debug control circuitry may then execute the debug command or commands from the token payload, as shown at block 562. Those commands may use privileged debug features 40 to access supplier assets 50, builder assets 52, and/or consumer assets 54.

However, if supplier authentication or taken validation fails, the debug control circuitry may report an error, as shown at block 542, and the process may end without the supplier getting access to privileged debug features 40.

Thus, the debug control circuitry prevents the supplier from using privileged debug features 40 after the PPD fuse has been set, unless either (a) the undo-PPD fuse has also been set, or (b) the builder has injected a fuse override token into processor 14.

Furthermore, the process for controlling access to privileged debug features 40 may include additional operations, such as those depicted in FIGS. 4A-4D for handling immediate debug tokens and delayed debug tokens, etc.

ADDITIONAL EMBODIMENTS

FIGS. 6-10 are block diagrams of exemplary computer architectures. Such architectures may include technology for controlling access to processor debug features as described herein. The same or similar elements in FIGS. 6-10 bear like reference numerals. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
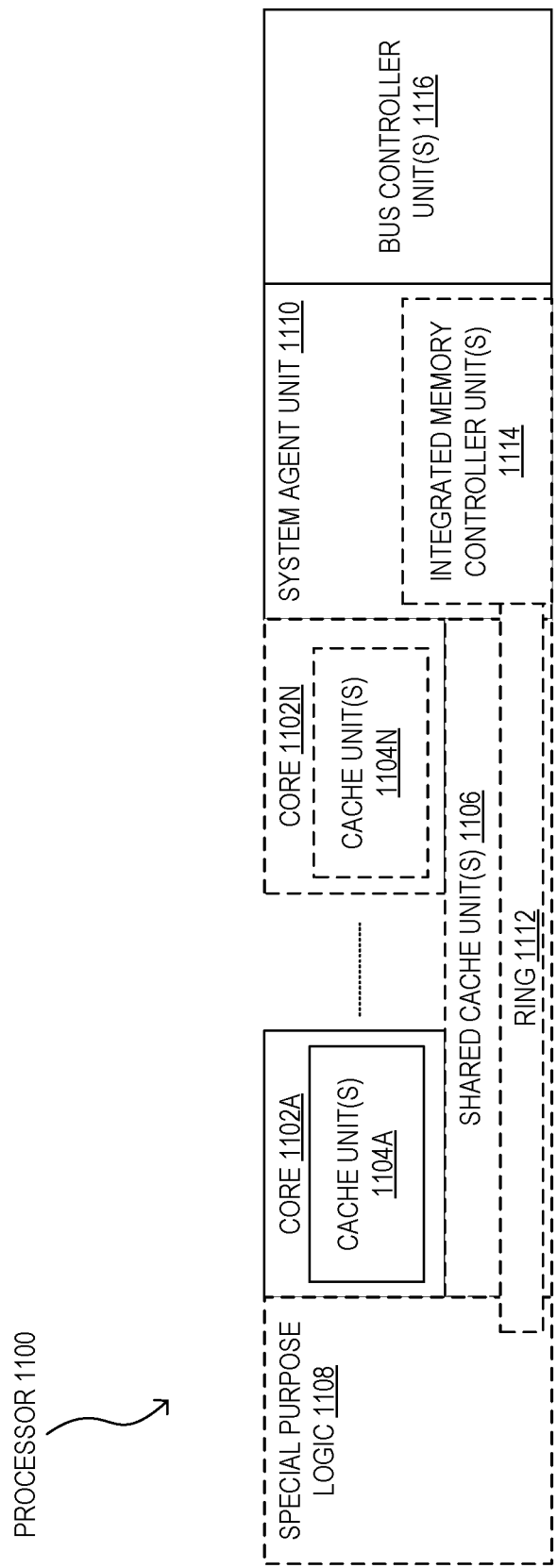
FIG. 6 is a block diagram of a processor that may have more than one core, may have an integrated memory controller, and may have integrated graphics according to one or more embodiments.

FIG. 6 is a block diagram of a processor 1100 that may have more than one core, may have an integrated memory controller, and may have integrated graphics according to one or more embodiments. The solid lined boxes in FIG. 6 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 7:
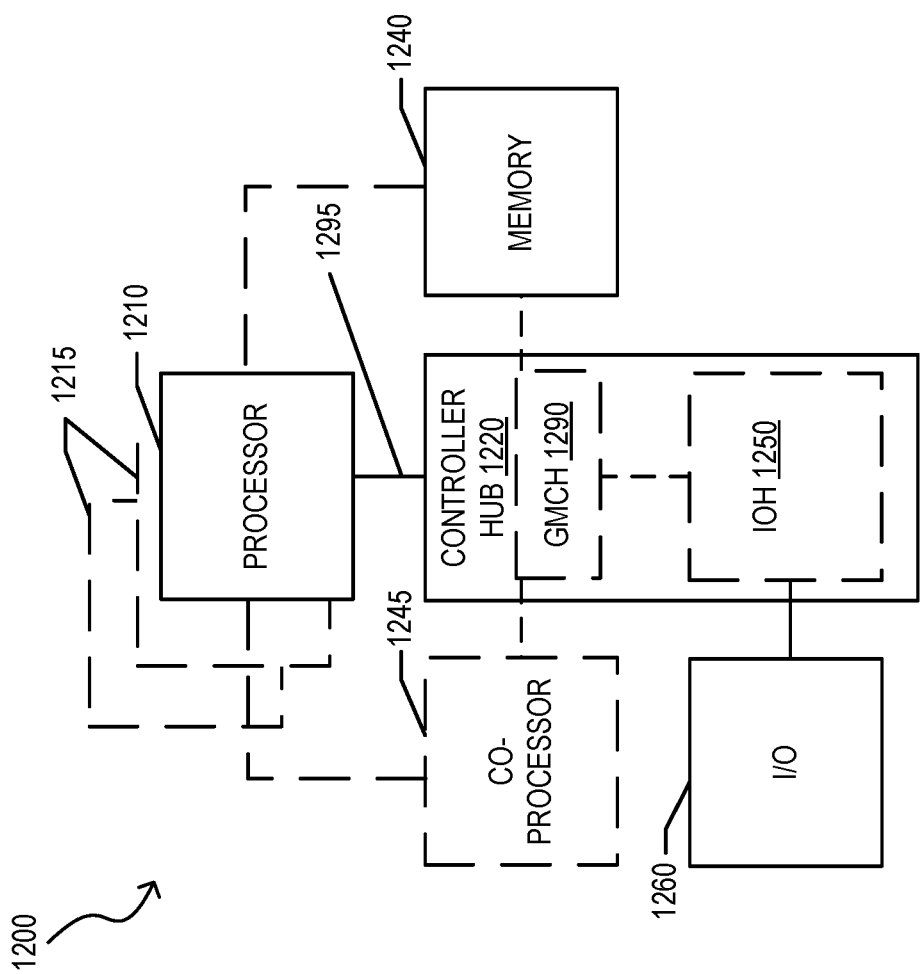
FIG. 7 is a block diagram of a system according to one or more embodiments.

FIG. 7 is a block diagram of a system 1200 according to one or more embodiments. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 7 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 8:
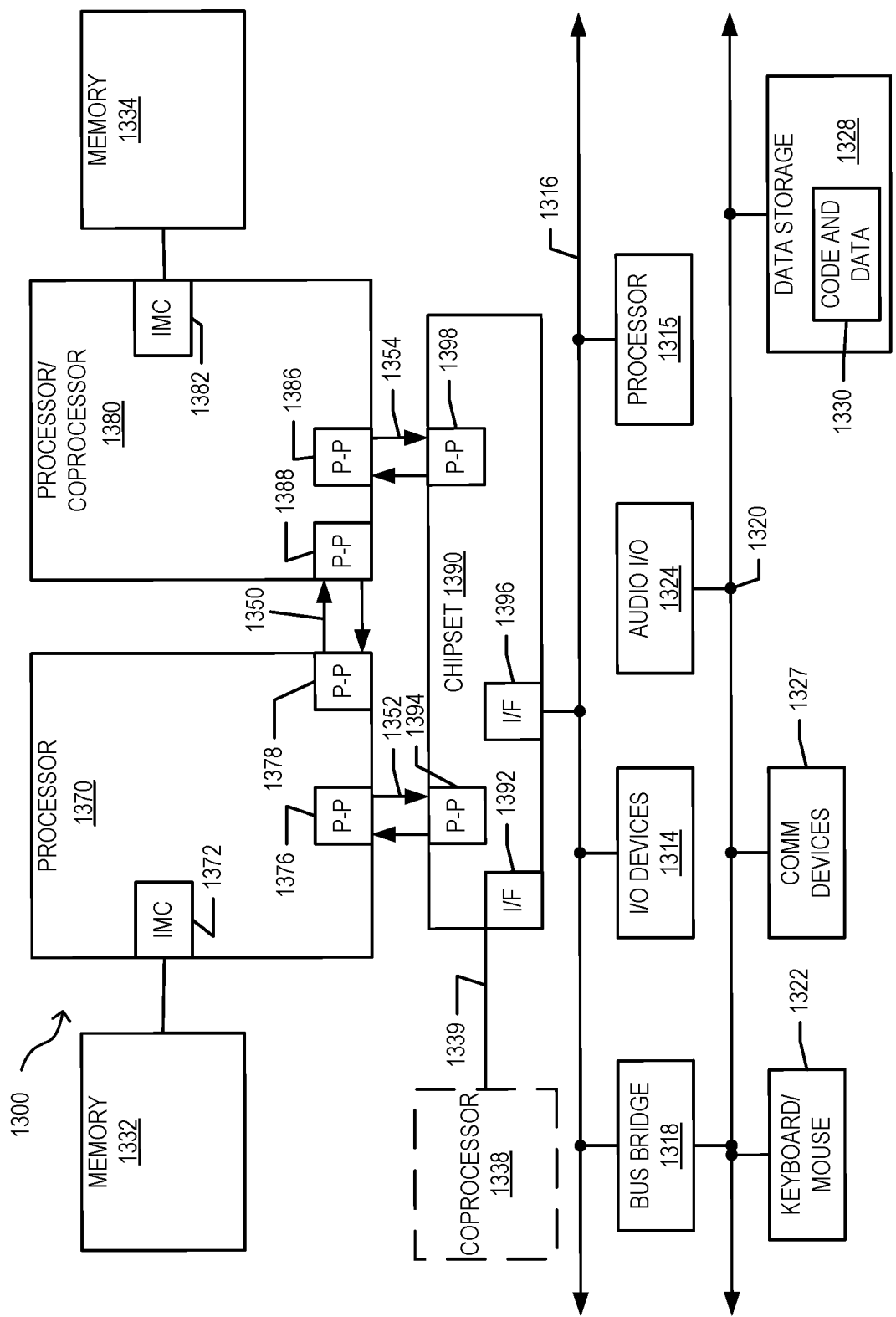
FIGS. 8-9 are block diagrams of more specific exemplary systems according to one or more embodiments.
Figure 9:
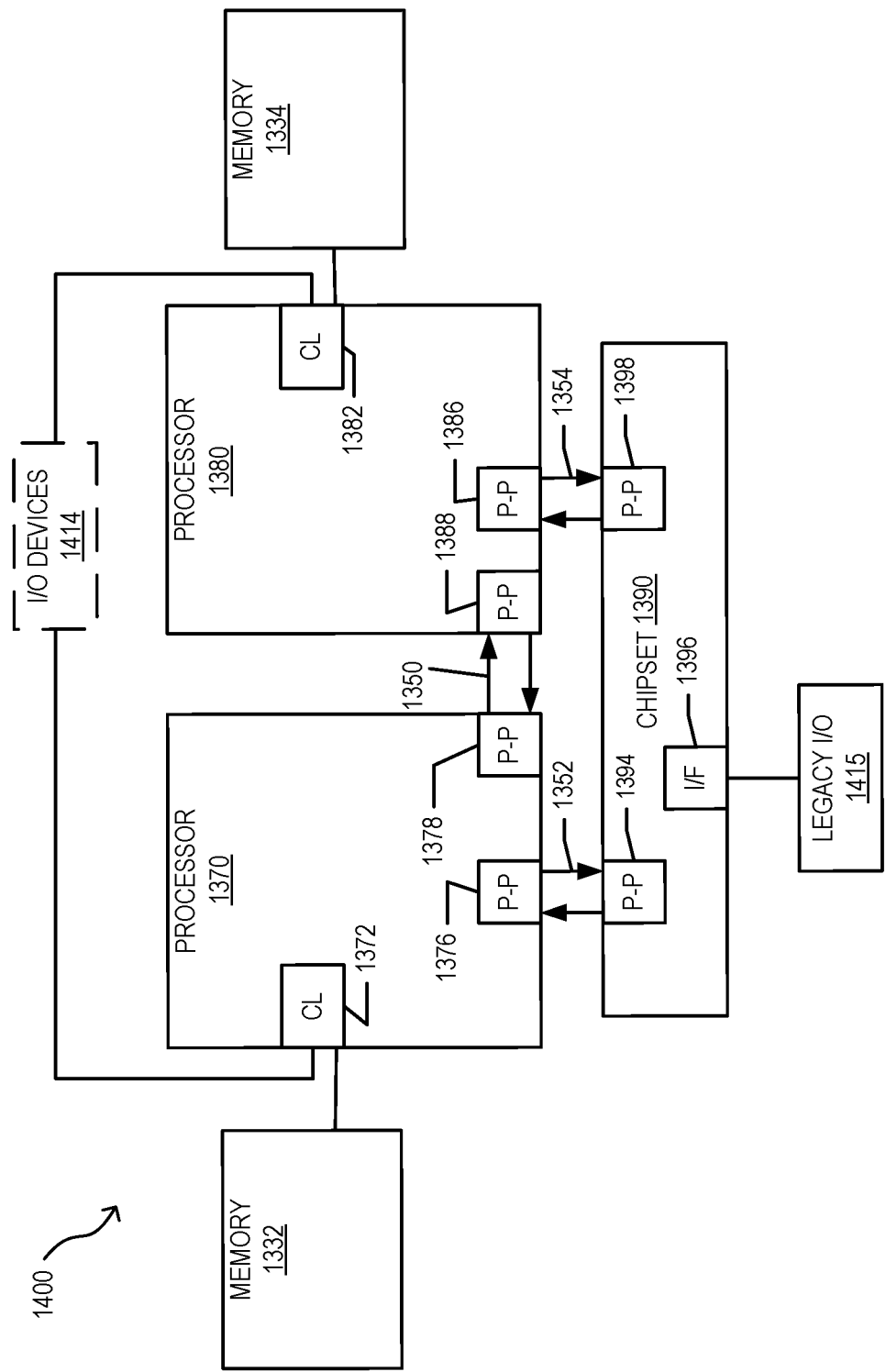

FIGS. 8 and 9 are block diagrams of more specific exemplary systems 1300 and 1400 according to one or more embodiments. As shown in FIG. 8, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 8, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 8, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays (FPGAs), or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 7, a system may implement a multi-drop bus or other such architecture.

FIG. 9 presents a block diagram of a second more specific exemplary system 1400 in accordance with on one or more embodiments. Certain aspects of FIG. 8 have been omitted from FIG. 9 in order to avoid obscuring other aspects of FIG. 9.

FIG. 9 illustrates that the processors 1370, 1380 may include integrated memory and I/O control logic ("CL") 1372 and 1382, respectively. Thus, the CL 1372, 1382 include integrated memory controller units and include I/O control logic. FIG. 9 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 10:
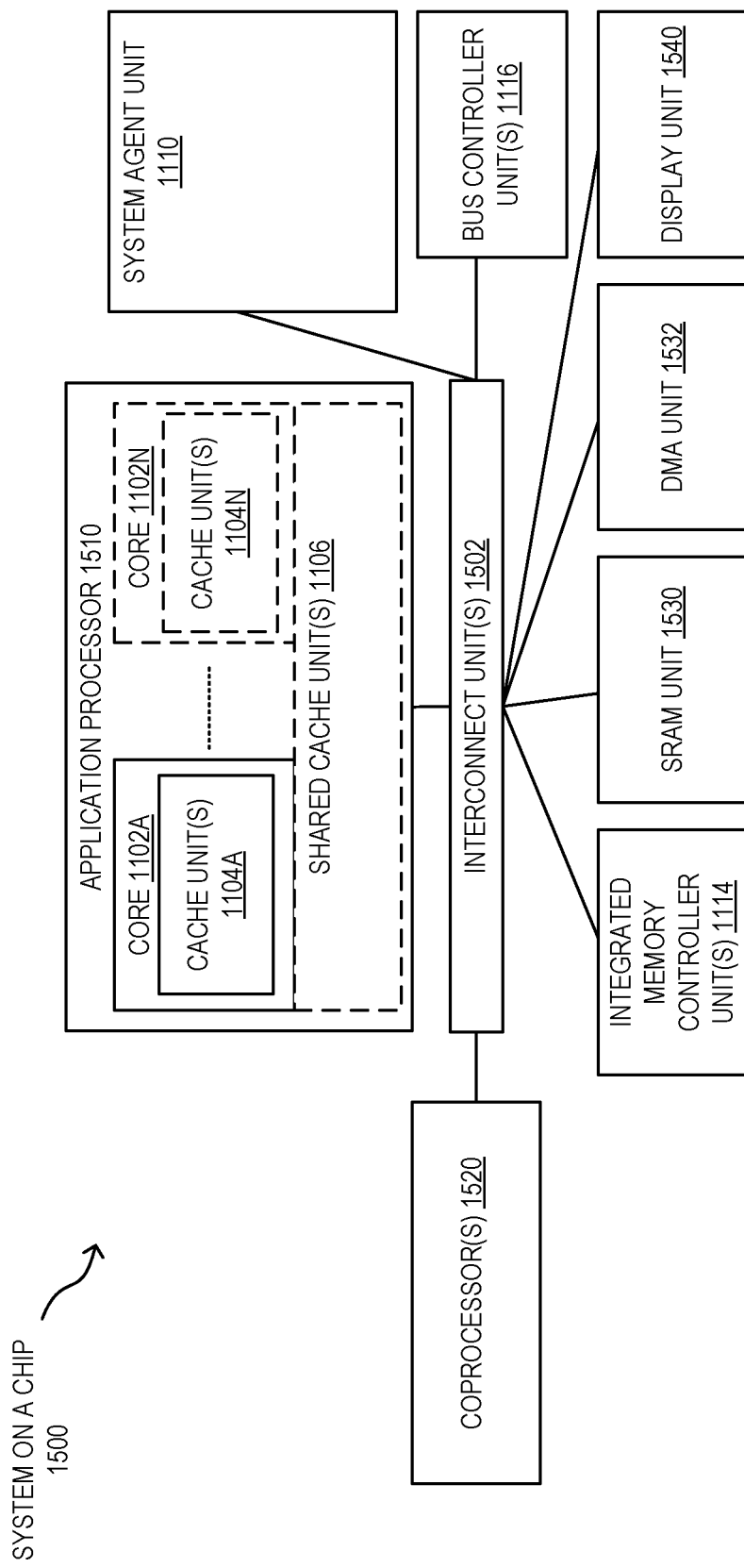
FIG. 10 is a block diagram of a system on a chip according to one or more embodiments.

FIG. 10 is a block diagram of a system on a chip (SoC) 1500 according to one or more embodiments. Dashed lined boxes are optional features on more advanced SoCs. In FIG. 10, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, security processor, or the like.

As indicated above, in one or more embodiments or scenarios, the builder of a data processing system controls access to debug features of a processor in the data processing system through use of debug control settings such as PPD, PUD, undo-PPD, and undo-PUD fuses. Accordingly, the builder may be referred to as the primary authorized user. In one or more alternative embodiments or scenarios, the builder delivers the data processing system to the consumer without setting debug control settings, and the consumer then sets those settings as desired. For instance, the consumer may load a public key that belongs to the consumer into the first entry of the ADL, thereby establishing the consumer as the primary authorized user, and the processor may thereafter use the consumer's public key to determine (a) whether operations like setting the undo-PPD fuse and setting the undo-PUD fuse are being performed by the primary authorized user and (b) whether a lock override token has been signed by the primary authorized user.

In one embodiment, the debug control circuitry in a processor restricts access to debug features of the processor based on one or more debug restriction fuses and/or one or more credentials. For instance, the debug control circuitry may restrict access to privileged debug feature, based on a credential from the manufacturer of the processor, and the debug control circuitry may restrict access to public debug feature based on a credential from a downstream entity. A downstream entity may be a builder who builds a data processing system that includes the processor or a consumer who obtains possession or control of the data processing system after it has been built. Any entity with credentials in the data processing system to indicate that that entity has been approved to access debug features may be referred to as an "approved entity."

CONCLUSION

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory of a processor may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, firmware, microcode, and other types of software components. Also, it should be understood that a software module may include more than one component, and those components may cooperate to complete the operations of the module. Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object oriented programming language, or in assembly or machine language. The mechanisms described herein are not limited to any particular programming language. The language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as apparatus and in particular as program products. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. For instance, in some embodiments, some or all of the control logic for implementing some or all of the described operations may be implemented in hardware logic (e.g., as firmware and/or microcode in an integrated circuit chip, as a programmable gate array (PGA) in a chip, as an application-specific integrated circuit (ASIC) in a chip, as any other suitable type of hardware circuitry in a chip, or as a combination of two or more different instances and/or types of hardware logic in one or more chips). Also, terms such as "circuit" and "circuitry" may be used interchangeably herein. Those terms and terms like "logic" may be used to refer to analog circuitry, digital circuitry, hard-wired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip (SoCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. For instance, two components in a data processing system may be described as being "in communication with" each other if those two components are capable of communicating with each other (possibly via one or more intermediate components) when the data processing system is operating.

Also, some components of a data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line.

Also, for purpose of this disclosure, the term "processor" denotes a hardware component that is capable of executing software. For instance, a processor may be implemented as a central processing unit (CPU), as a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Similarly, components which have been described as residing within other components in an example embodiment may be arranged differently in alternative embodiments. For instance, at least some of the components described above as residing in NVS in a processor may reside in NVS outside of the processor in alternative embodiments.

Embodiments include the following examples:

Example A1 is a processor that was manufactured by a manufacturer. The processor comprises privileged debug operational circuitry and a debug restriction fuse. The debug restriction fuse is a one-time programmable fuse. The processor also comprises a credential store, a credential of the manufacturer in the credential store, and debug control circuitry to automatically restrict access to the privileged debug operational circuitry, based on the debug restriction fuse.

Example A2 is a processor according to Example A1, wherein the debug restriction fuse comprises a PPD fuse. Also, the debug control circuitry is to, in response to an attempt by a debugger to use the privileged debug operational circuitry when the PPD fuse is set, (a) determine whether a downstream entity has approved use of the privileged debug operational circuitry, (b) determine whether the debugger is the manufacturer, based on the credential in the credential store, and (c) allow access to the privileged debug operational circuitry only if (i) the downstream entity has approved use of the privileged debug operational circuitry and (ii) the debugger is the manufacturer.

Example A3 is a processor according to Example A2, wherein the debug control circuitry is to determine that the downstream entity has approved use of the privileged debug operational circuitry based on a debug token from the downstream entity.

Example A4 is a processor according to Example A3, wherein the debug control circuitry is to use a credential of the downstream entity to verify that the debug token is from the downstream entity.

Example A5 is a processor according to Example A2, wherein the debug restriction fuse further comprises an undo-PPD fuse. Also, the debug control circuitry is to determine that the downstream entity has approved use of the privileged debug operational circuitry if the undo-PPD fuse is set. Example A5 may also include the features of any one or more of Examples A3-A5.

Example A6 is a processor according to Example A5, wherein the debug control circuit is configured to allow the undo-PPD fuse to be set only by one particular downstream entity.

Example A7 is a processor according to Example A1, wherein the processor further comprises public debug operational circuitry, and the debug restriction fuse comprises a PUD fuse and an undo-PUD fuse. Also, the debug control circuitry is to, in response to an attempt by a debugger to use the public debug operational circuitry when the PUD fuse is set and the undo-PUD fuse is clear, (a) determine whether the debugger is authorized; (b) disallow access to the public debug operational circuitry if the debugger is not authorized, and (c) allow access to the public debug operational circuitry if the debugger is authorized. Example A7 may also include the features of any one or more of Examples A2-A6.

Example A8 is a processor according to Example A7, wherein the debug control circuitry is to allow access to the public debug operational circuitry without determining whether the debugger is authorized in response to at least one determination from the group consisting of (a) a determination that the PUD fuse is clear, and (b) a determination that the PUD fuse is set and the undo-PUD fuse is set.

Example B1 is a data processing system comprising a processor that was manufactured by a manufacturer, random access memory in communication with the processor, privileged debug operational circuitry in the processor, and a debug restriction fuse in the processor, wherein the debug restriction fuse is a one-time programmable fuse. The processor also comprises a credential store and a credential of the manufacturer in the credential store. The processor also comprises debug control circuitry to automatically restrict access to the privileged debug operational circuitry, based on the debug restriction fuse.

Example B2 is a data processing system according to Example B1, wherein the debug restriction fuse comprises a PPD fuse. Also, the debug control circuitry is to, in response to an attempt by a debugger to use the privileged debug operational circuitry when the PPD fuse is set, (a) determine whether a downstream entity has approved use of the privileged debug operational circuitry, (b) determine whether the debugger is the manufacturer, based on the credential in the credential store, and (c) allow access to the privileged debug operational circuitry only if (i) the downstream entity has approved use of the privileged debug operational circuitry and (ii) the debugger is the manufacturer.

Example B3 is a data processing system according to Example B2, wherein the debug control circuitry is to determine that the downstream entity has approved use of the privileged debug operational circuitry based on a debug token from the downstream entity.

Example B4 is a data processing system according to Example B3, wherein the debug control circuitry is to use a credential of the downstream entity to verify that the debug token is from the downstream entity.

Example B5 is a data processing system according to Example B2, wherein the debug restriction fuse further comprises an undo-PPD fuse. Also, the debug control circuitry is to determine that the downstream entity has approved use of the privileged debug operational circuitry if the undo-PPD fuse is set. Example B5 may also include the features of any one or more of Examples B3-B4.

Example B6 is a data processing system according to Example B5, wherein the debug control circuit is configured to allow the undo-PPD fuse to be set only by one particular downstream entity.

Example B7 is a data processing system according to Example B1, wherein the processor further comprises public debug operational circuitry and the debug restriction fuse comprises a PUD fuse and an undo-PUD fuse. Also, the debug control circuitry is to, in response to an attempt by a debugger to use the public debug operational circuitry when the PUD fuse is set and the undo-PUD fuse is clear, (a) determine whether the debugger is authorized, (b) disallow access to the public debug operational circuitry if the debugger is not authorized, and (c) allow access to the public debug operational circuitry if the debugger is authorized. Example B7 may also include the features of any one or more of Examples B2-B6.

Example B8 is a data processing system according to Example B7, wherein the debug control circuitry is to allow access to the public debug operational circuitry without determining whether the debugger is authorized in response to at least one determination from the group consisting of (a) a determination that the PUD fuse is clear, and (b) a determination that the PUD fuse is set and the undo-PUD fuse is set.

Example B9 is a data processing system according to Example B7, wherein the credential store in the processor comprises a first credential store, and the data processing system further comprises a second credential store to store a credential of a downstream entity. Also, the debug control circuit is configured to allow the undo-PUD fuse to be set only by the downstream entity associated with the credential in the second credential store.

Example C1 is a method comprising, in a data processing system with processor comprising (a) privileged debug operational circuitry, (b) a credential store, (c) a credential of a manufacturer of the processor in the credential store, and (d) PPD fuse, wherein the PPD fuse is a one-time programmable fuse, detecting an attempt by a debugger to use the privileged debug operational circuitry when the PPD fuse is set. The method also comprises, in response to detecting the attempt to use the privileged debug operational circuitry, (a) determining whether a downstream entity has approved use of the privileged debug operational circuitry; (b) determining whether the debugger is the manufacturer, based on the credential in the credential store; and (c) allowing access to the privileged debug operational circuitry only if (i) the downstream entity has approved use of the privileged debug operational circuitry and (ii) the debugger is the manufacturer.

Example C2 is a method according to Example C1, wherein the operation of determining whether a downstream entity has approved use of the privileged debug operational circuitry is based on at least one item from the group consisting of (a) a debug token from the downstream entity to indicate that the downstream entity has approved use of the privileged debug operational circuitry, and (b) an undo-PPD fuse in the processor.

Example C3 is a method according to Example C1, further comprising, in response to an attempt by the debugger to use public debug operational circuitry of the processor when a PUD fuse in the processor is set and an undo-PUD fuse in the processor is clear, (a) determining whether the debugger is authorized, (b) disallowing access to the public debug operational circuitry if the debugger is not authorized, and (c) allowing access to the public debug operational circuitry if the debugger is authorized. Example C3 may also include the features of Example C2.

In view of the wide variety of useful permutations that may be readily derived from the example embodiments described herein, this detailed description is intended to be illustrative only, and should not be construed as limiting the scope of coverage.

What is claimed is:

1. A processor that was manufactured by a manufacturer, the processor comprising:
   privileged debug operational circuitry;
   a debug restriction fuse, wherein the debug restriction fuse is a one-time programmable fuse;
   a credential store;
   a credential of the manufacturer in the credential store; and
   debug control circuitry to automatically restrict access to the privileged debug operational circuitry, based on the debug restriction fuse;
   wherein the debug restriction fuse comprises a prevent-privileged-debug (PPD) fuse;
   wherein the debug control circuitry is to, in response to an attempt by a debugger to use the privileged debug operational circuitry when the PPD fuse is set, allow access to the privileged debug operational circuitry only if (i) a downstream entity has approved use of the privileged debug operational circuitry and (ii) the credential in the credential store indicates that the debugger is the manufacturer; and
   wherein the debug control circuitry is to determine whether the downstream entity has approved use of the privileged debug operational circuitry based on at least one item from the group consisting of:
   a debug token from the downstream entity; and
   an undo-PPD fuse in the processor.

2. A processor according to claim 1, wherein the debug control circuitry is to use a credential of the downstream entity to verify that the debug token is from the downstream entity.

3. A processor according to claim 1, wherein:
   the debug restriction fuse further comprises the undo-PPD fuse; and
   the debug control circuitry is to determine that the downstream entity has approved use of the privileged debug operational circuitry if the undo-PPD fuse is set.

4. A processor according to claim 3, wherein the debug control circuit is configured to allow the undo-PPD fuse to be set only by one particular downstream entity.

5. A processor according to claim 1, wherein:
   the processor further comprises public debug operational circuitry;

the debug restriction fuse comprises a prevent-unauthorized-debug (PUD) fuse and an undo-PUD fuse; and the debug control circuitry is to, in response to an attempt by a debugger to use the public debug operational circuitry when the PUD fuse is set and the undo-PUD fuse is clear:

determine whether the debugger is authorized;

disallow access to the public debug operational circuitry if the debugger is not authorized; and allow access to the public debug operational circuitry if the debugger is authorized.

6. A processor according to claim 5, wherein the debug control circuitry is to allow access to the public debug operational circuitry without determining whether the debugger is authorized in response to at least one determination from the group consisting of:

a determination that the PUD fuse is clear; and a determination that the PUD fuse is set and the undo-PUD fuse is set.

7. A data processing system comprising:

a processor that was manufactured by a manufacturer;

random access memory in communication with the processor;

privileged debug operational circuitry in the processor;

a debug restriction fuse in the processor, wherein the debug restriction fuse is a one-time programmable fuse;

a credential store in the processor;

a credential of the manufacturer in the credential store; and debug control circuitry in the processor to automatically restrict access to the privileged debug operational circuitry, based on the debug restriction fuse;

wherein the debug restriction fuse comprises a prevent-privileged-debug (PPD) fuse;

wherein the debug control circuitry is to, in response to an attempt by a debugger to use the privileged debug operational circuitry when the PPD fuse is set, allow access to the privileged debug operational circuitry only if (i) a downstream entity has approved use of the privileged debug operational circuitry and (ii) the credential in the credential store indicates that the debugger is the manufacturer; and wherein the debug control circuitry is to determine whether the downstream entity has approved use of the privileged debug operational circuitry based on at least one item from the group consisting of:

a debug token from the downstream entity; and an undo-PPD fuse in the processor.

8. A data processing system according to claim 7, wherein the debug control circuitry is to use a credential of the downstream entity to verify that the debug token is from the downstream entity.

9. A data processing system according to claim 7, wherein:

the debug restriction fuse further comprises the undo-PPD fuse; and the debug control circuitry is to determine that the downstream entity has approved use of the privileged debug operational circuitry if the undo-PPD fuse is set.

10. A data processing system according to claim 9, wherein the debug control circuit is configured to allow the undo-PPD fuse to be set only by one particular downstream entity.

11. A data processing system according to claim 7, wherein:

the processor further comprises public debug operational circuitry;

the debug restriction fuse comprises a prevent-unauthorized-debug (PUD) fuse and an undo-PUD fuse; and the debug control circuitry is to, in response to an attempt by a debugger to use the public debug operational circuitry when the PUD fuse is set and the undo-PUD fuse is clear:

determine whether the debugger is authorized;

disallow access to the public debug operational circuitry if the debugger is not authorized; and allow access to the public debug operational circuitry if the debugger is authorized.

12. A data processing system according to claim 11, wherein the debug control circuitry is to allow access to the public debug operational circuitry without determining whether the debugger is authorized in response to at least one determination from the group consisting of:

a determination that the PUD fuse is clear; and a determination that the PUD fuse is set and the undo-PUD fuse is set.

13. A data processing system according to claim 11, wherein:

the credential store in the processor comprises a first credential store;

the data processing system further comprises a second credential store to store a credential of a downstream entity; and the debug control circuit is configured to allow the undo-PUD fuse to be set only by the downstream entity associated with the credential in the second credential store.

14. A method comprising:

in a data processing system with processor comprising (a) privileged debug operational circuitry, (b) a credential store, (c) a credential of a manufacturer of the processor in the credential store, and (d) a prevent-privileged-debug (PPD) fuse, wherein the PPD fuse is a one-time programmable fuse, detecting an attempt by a debugger to use the privileged debug operational circuitry when the PPD fuse is set; and in response to detecting the attempt to use the privileged debug operational circuitry:

determining whether a downstream entity has approved use of the privileged debug operational circuitry;

determining whether the debugger is the manufacturer, based on the credential in the credential store; and allowing access to the privileged debug operational circuitry only if (i) the downstream entity has approved use of the privileged debug operational circuitry and (ii) the debugger is the manufacturer;

wherein the operation of determining whether a downstream entity has approved use of the privileged debug operational circuitry is based on at least one item from the group consisting of:

a debug token from the downstream entity to indicate that the downstream entity has approved use of the privileged debug operational circuitry; and an undo-PPD fuse in the processor.

15. A method according to claim 14, further comprising, in response to an attempt by the debugger to use public debug operational circuitry of the processor when a prevent-unauthorized-debug (PUD) fuse in the processor is set and an undo-PUD fuse in the processor is clear:

determining whether the debugger is authorized;
disallowing access to the public debug operational circuitry if the debugger is not authorized; and
allowing access to the public debug operational circuitry if the debugger is authorized.

* * * * *